United States Patent
Wienand et al.

(10) Patent No.: US 6,232,618 B1
(45) Date of Patent: May 15, 2001

(54) SENSOR WITH TEMPERATURE-DEPENDENT MEASURING RESISTOR AND ITS USE FOR TEMPERATURE MEASUREMENT

(75) Inventors: Karlheinz Wienand, Aschaffenburg; Andreas Müller, Zeitlofs, both of (DE)

(73) Assignee: Heraeus Electro-Nite International N.V., Houthalen (BE)

( * ) Notice: Subject to any disclaimer, the term of this patent is extended or adjusted under 35 U.S.C. 154(b) by 0 days.

(21) Appl. No.: 09/218,659

(22) Filed: Dec. 22, 1998

(30) Foreign Application Priority Data

Dec. 23, 1997 (DE) .............................. 197 57 258

(51) Int. Cl.$^7$ .............................. H01L 23/58; G01K 7/00
(52) U.S. Cl. .............................. 257/48; 374/171; 374/185; 216/16; 438/14
(58) Field of Search .............................. 438/14; 257/401, 257/48; 216/16; 73/25.03, 204; 338/306; 205/717; 374/12, 171, 185

(56) References Cited

U.S. PATENT DOCUMENTS

| | | | |
|---|---|---|---|
| 3,613,454 | 10/1971 | McFadin | 374/185 |
| 5,543,775 | * 8/1996 | Huck | 338/306 |
| 5,623,097 | * 4/1997 | Horiguchi et al. | 73/204 |
| 5,756,878 | * 5/1998 | Muto et al. | 73/25.03 |
| 5,842,788 | * 12/1998 | Danley et al. | 374/12 |
| 5,900,135 | * 5/1999 | Zitzmann | 205/717 |
| 6,004,471 | * 12/1999 | Chuang | 216/16 |

FOREIGN PATENT DOCUMENTS

| | | |
|---|---|---|
| 22 08 852 | 9/1972 | (DE) . |
| 24 60 648 A1 | 6/1976 | (DE) . |
| 2 145 229 | 3/1985 | (GB) . |

OTHER PUBLICATIONS

Tietze and Schenk, *Semiconductor Circuit Technology*, 5th Edition pp. 103–105, Springer–Verlag (1980).

Beuth, Vogel–Buchverlag, *Electronics 2, Structural Components*, p. 231, Würzburg (1984/85).

(List continued on next page.)

Primary Examiner—Long Pham
Assistant Examiner—William David Coleman
(74) Attorney, Agent, or Firm—Akin, Gump, Strauss, Hauer & Feld, L.L.P.

(57) ABSTRACT

A temperature-dependent measuring resistor is connected to a reference resistor in series, wherein this series connection is flowed through by a constant impressed current. A connection point located between the two resistors is connected to the N-input of a first feedback differential amplifier, whose P-input is supplied with direct current voltage tapped from a voltage divider. During a temperature increase in the area of the measuring resistor, the potential increases at the output of the first differential amplifier, which delivers the constant impressed current and is connected to the measuring resistor, while the potential at the output of the differential amplifier falls when the temperature falls. The temperature-dependent voltage signal that is output at the differential amplifier is supplied in subtracting connection to the P-input of an after-connected second differential amplifier, whose output is connected to a measurement unit for measuring the voltage characteristic of the temperature. In a preferred embodiment, the measuring resistor made of platinum or of a platinum-based alloy is directly mounted on a substrate made of ceramic ($Al_2O_3$), which forms a thin-layer component. On the surface of the thin-layer component the reference resistor and the micro-module are mounted in addition. The temperature sensor has, because of an evaluation circuit constructed as a micro-module, a compact structural form and can be used up to a temperature of approx. 300° C.

13 Claims, 2 Drawing Sheets

OTHER PUBLICATIONS

Michael Verbeck, *High Temperature–Stable Analog Circuit Components in SIMOX Technology*, disseration to the Gerhard–Mercator University–Comprehensive College–Duisburg(Department of Electrical Engineering) on May 23, 1996 and published in 1997 in Series 9 (Electronics) of the *VDI Progress Report* under No. 262 in VDI Verlag GmbH, Düsseldorf.

German Industrial Standard (DIN) EN 60751 for Industrial Platinum—Resistance Thermometer and Platinum—Measuring Resistance (Jul. 1996).

Jacques, Harold; Precious Metal Resistors—Precise Temperature Sensors; "IEEE Instrumentation and Measurement Technology Conference," Washington, DC, Apr. 25–27, 1989; IEEE Catalog No. 89CH2707–8; pp. i, 29–33.

Williams, Jim; Micropower Circuits Assist Low–Current Signal Conditioning; "E.D.N. Electrical Design News" 32; Newton, MA, USA; Aug. 6, 1987; No. 16; pp. 123–132.

Müller, Jörg; Sensorenherstellung Mit Dünnschichttechnik; NTZ Nachrichtentechnische Zeitschrift; Bd. 40; (1987) Juli, No. 7; Berlin, W. Germany.

* cited by examiner

SENSOR WITH TEMPERATURE-DEPENDENT MEASURING RESISTOR AND ITS USE FOR TEMPERATURE MEASUREMENT

BACKGROUND OF THE INVENTION

The invention involves a sensor having a temperature-dependent measuring resistance (resistor), that is connected by a connection contact to an evaluation circuit and is flowed through by an impressed current, wherein a voltage signal dropping across the measuring resistor is determined, which relates to its temperature in an at least approximately linear proportional manner, wherein the measuring resistor is electrically connected at one end both with a constant current source as well as with an electrical circuit in order to output a temperature-voltage signal, while a connection point of a series connection made of the measuring resistor and a reference resistance is connected to the electrical circuit. The invention also relates to a use of the sensor in an electrical circuit for temperature measurement.

From U.S. Pat. No. 3,613,454 a device is known for temperature measurement using a temperature-sensitive measuring resistor that is flowed through by an impressed current, wherein the voltage generated on the measuring resistor is supplied as an input signal to a differential amplifier, whose output forms a voltage output signal that is at least approximately linearly proportional to the measuring resistor temperature. For this purpose, the impressed current is supplied from the output of a first differential amplifier to the measuring resistor connected to the input of a second differential amplifier, such that the current flows through a reference resistor that is connected to it in series, whose voltage is supplied as a signal for inverse feedback to the input of the first differential amplifier for the purpose of stabilizing the impressed current.

It proves to be problematic that the construction of temperature sensors using wound platinum wire is relatively expensive.

Furthermore, from published German patent application DE 24 60 648 A1, a circuit arrangement is known for measuring temperature using a platinum resistance thermometer in linear relation to the output voltage, wherein as a function of a reference voltage, a differential amplifier impresses onto the platinum resistance, acting as a temperature sensor, a current that remains constant with the value of the platinum resistance, so that the voltage on the platinum resistance increases linearly with the temperature. In this way, using a suitably dimensioned differential amplifier, a voltage is generated against the reference voltage in such a way that the voltage offset for the initial temperature of a given temperature range disappears. For larger currents through the platinum resistance, the intrinsic heating can be reduced by an impulse sequence with the amplitude of the input voltage.

For temperature equalization of ovens, the desired temperature level of a temperature regulator is linearly preset as a voltage value. The desired voltage value can be obtained from the reference voltage using a potentiometer circuit; furthermore, the desired voltage value can also be preset by a digital-analog converter. This involves a relatively expensive arrangement for operating several ovens, wherein the respective components such as the comparator, digital memory, platinum thermometer, digital-analog converter, and progress control form their own respective circuit arrangements.

Furthermore, from published German patent application DT 22 08 852, a circuit arrangement is known for generating a linear temperature-dependent electric quantity using a resistor bridge circuit, wherein one of the bridge resistors is constructed as a platinum measuring resistor; the bridge diagonal being formed by a differential amplifier. In particular, the linearity of the platinum sensor is obtained by an inverse feedback effect that exceeds the positive feedback; the positive feedback thereby linearizes the output signal in reference to the temperature characteristic, whereby the inverse feedback prevents a tendency to oscillate.

This thus involves a circuit arrangement having many electronic components that is technically and spatially relatively expensive.

SUMMARY OF THE INVENTION

An object of the present invention is to construct a highly sensitive temperature sensor that has a small, compact construction and can be used up to a temperature of approximately 300° C.

This object of the invention is achieved according to a device in which the temperature-dependent measuring resistor and the reference resistor are each arranged as discrete structural components on a substrate having an electrically insulating surface, wherein the connection-contact banks for the measuring resistor and the connection contact banks for the reference resistor are each connected via strip conductors or wire connections to an evaluation circuit also arranged on the substrate in a micro-module.

This means that the impressed current flows through a series circuit formed by the measuring resistor and a reference resistor, wherein the potential of the connection point of both resistors is compared to a potential that is preset by the associated voltage supply on the input of a first feedback differential amplifier, wherein the potential applied at the output of the first differential amplifier is formed as a function of the temperature of the connected measuring resistor and is conducted further onto the P-input of an after-connected second differential amplifier in a subtracting circuit, wherein the output of the second differential amplifier yields a potential corresponding at least approximately to the temperature at the measuring resistor.

Also proving to be especially advantageous, along with the rapid responsiveness, is the high degree of amplification of the temperature signal values and the relatively small construction size, so that a sensor of this type can also be retrofit in already existing systems without particular problems.

In an advantageous embodiment both the measuring resistor and the reference resistor are each constructed as separate structural components, wherein the remaining part of the evaluation circuit is integrated in at least one micro-module. Herein, the P-input of the first differential amplifier is connected via the middle tap of a voltage distributor, made out of two resistors, to the binding posts of a direct-current supply, and the measuring resistor connected to the output of the first differential amplifier is connected in series with a reference resistor, wherein the connection point of both resistors is connected directly to the N-input of the first differential amplifier, while the output of the first differential amplifier is in addition connected to the P-input of an after-connected second differential amplifier in subtracting connection, wherein on the output of the second differential amplifier a voltage signal is applied that is proportional to the temperature on the measuring resistor.

It proves to be advantageous that the temperature-dependent measuring resistor and the reference resistor are each arranged as discrete structural components on one substrate with an electrically insulating surface, wherein the connection contact banks for the measuring resistor and the connection contact banks for the reference resistor are each connected via strip conductors or wire connections to the micro-module that is also arranged on the substrate. Here, the temperature-dependent measuring resistor is preferably manufactured by thin layer technology and the substrate is constructed as an electrically insulating ceramic, preferably consisting of $Al_2O_3$; the measuring resistor has a resistor layer made of platinum or of a platinum-based alloy. In a preferred embodiment the measuring resistor is directly mounted on the substrate, whereby the substrate and measuring resistor together form a thin layer component, on whose surface the reference resistor and the micro-module can be mounted or attached in addition.

The reference resistor preferably comprises an alloy made of nickel-chromium or constantan.

It is, however, also possible to mount both the measuring resistor and the reference resistor on the substrate by thick layer technology.

An essential advantage of the previously explained embodiment is seen in that the measuring resistor and the reference resistor can each be mounted as separate structural components on a common substrate together with the micro-module of the remaining evaluation circuit, so that the total arrangement represents for the user a compact, easily replaceable structural component.

The object of the invention is also achieved using the sensor in an electrical circuit for temperature measurement in which a temperature-dependent measuring resistor (1) connected to a reference resistor (7) in series, wherein this series connection is flowed through by a constant impressed current, a connection point (26) located between both resistors is connected to an N-input (16) of a first feedback differential amplifier (13) that outputs the constant impressed current, and an P-input (15) of the first differential amplifier is supplied with direct current voltage tapped from a voltage distributor, wherein during a temperature increase in an area of the measuring resistor (1) a potential at an output (19) of the first differential amplifier (13) connected to the measuring resistor (1) increases, while a potential at the output (19) of the differential amplifier (13) falls when the temperature falls, and a temperature-dependent voltage signal that is output at the differential amplifier (13) is supplied to a P-input (17) of an after-connected second differential amplifier (14) preset with a reverse feedback resistor (30), wherein an output of this second differential amplifier (14) is connected to a measurement unit for measuring a voltage characteristic of the temperature.

It proves to be especially advantageous that the accuracy of the sensor meets the DIN (German Industrial Standards) standard EN 60751 Class B.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiment(s) which are presently preferred. It should be understood, however, that the invention is not limited to the precise arrangements and instrumentalities shown. In the drawings.

DETAILED DESCRIPTION OF THE INVENTION

Figure 1:
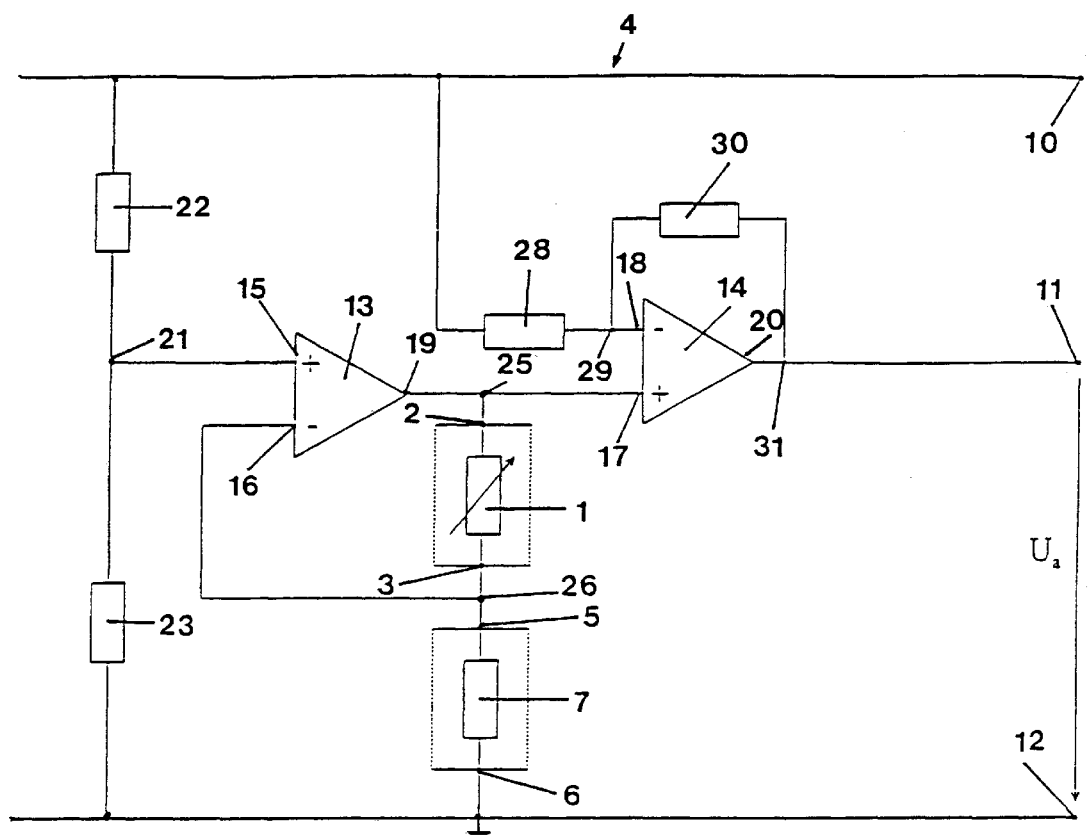
FIG. 1 shows a simplified block circuit diagram of the evaluation circuit together with the temperature-sensitive measuring resistor and a reference resistor.

According to FIG. 1, the read-out circuit consists of a micro-electronic circuit 4, which is connected via connection contact banks 2 and 3 to a separate, temperature-dependent measuring resistor 1 and via connection contact banks 5, 6 to a separate reference resistor 7. In addition, from the block circuit diagram according to FIG. 1 the outwardly leading connection contact surfaces' for the direct current voltage supply and voltage measurement signal are recognizable, wherein connection contact surfaces 10 and 12 for connection to a direct current supply (not shown here), connection contact surfaces 11 and 12 for connecting to a voltage measuring device for the measurement of the output voltage are connected with the connection contact surface 12 as a ground.

The read-out circuit 4 has two differential amplifiers 13 and 14, that are connected for their current supply to the binding post connection contact surfaces 10 (positive) and 12 (negative), wherein this connection is considered to be a purely ordinary measure and for the purpose of better overview is not depicted here.

The first differential amplifier 13 is connected by its (non-inverting) positive input 15 to a middle tap 21 of a voltage divider consisting of two resistors 22, 23 and which is supplied via connection contact surfaces 10 and 12 from the direct current source (not depicted here). Output 19 of the first differential amplifier 13 is connected to a connection point 25 that, on the one hand, is connected to the positive input 17 of the second differential amplifier 14 and, on the other hand, is connected to the connection contact bank 2 for the temperature-dependent measuring resistor 1. The other connection contact bank 3 for the temperature-dependent resistor 1 is connected to a middle tap 26, that connects the second connection contact bank 3 to the first connection contact bank 5 for the reference resistor 7, whereby the measuring resistor 1 and the reference resistor 7 form a series connection. The middle tap 26 is connected electrically to the negative input 16 of the differential amplifier 13. Furthermore, the reference resistor 7 is connected via the connection contact bank 6 to the connection contact surface 12 of the read-out circuit 4, which is at ground voltage. The first differential amplifier 13 is connected as a non-inverting stabilized feedback differential amplifier, as is described, for example, on pages 103–105 of the book *Semiconductor Circuit Technology* by Tietze and Schenk, 5th edition, Springer-Verlag (1980).

The second differential amplifier 14 is constructed as a subtracting circuit, wherein its negative input 18 is connected via resistor 28 with the positive connection contact surface 10 of the voltage supply, and the N-input 18 is in addition connected via the connection point 29 to the resistor 30 that functions as an inverse feedback, which is connected via connection point 31 to the output 20 of the second differential amplifier 14 and at the same time rests on the contact connection surface 11 provided for the temperature-signal output. A subtracting circuit of this type is known, for example, to the artisan from the book, *Electronics 2, Structural Components* by Beuth, Vogel-Buchverlag, Würzburg (1984/85) page 231.

Figure 2:
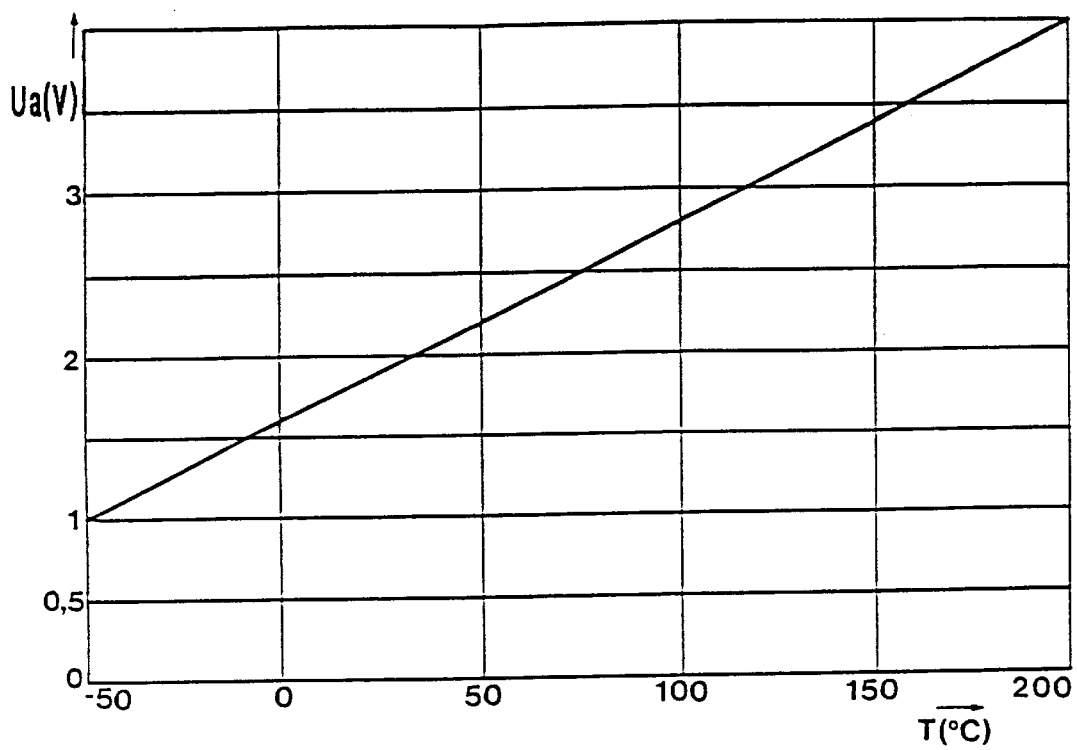
FIG. 2 shows the output voltage $U_A$ in volts applied at the output of the second differential amplifier as a function of the temperature T of the measuring resistor in degrees Celsius.

In the following, the operation of the circuit arrangement depicted in FIG. 1 is explained in greater detail using the diagram depicted in FIG. 2.

In practice, connection contact surface 10 is connected to a potential of +5 volts, while the binding post 12 lies at ground potential (i.e. conducts zero-potential). The voltage tap 21 lying between the two resistors 22, 23 is connected to the positive input 15 of the differential amplifier 13, where for the purpose of simplification an ideal differential amplifier is assumed, which has an infinitely large input resistance, so that in the positive input 15 no current flows. This prerequisite also applies for the inverting or negative input 16 as well as for the inputs 17 and 18 of the second, later-described differential amplifier 14. Logically, the ideal case is also assumed for the outputs 19 and 20 of the two differential amplifiers 13 and 14, i.e. that their output resistances are equal to zero.

In the stationary state, differential amplifier 13 outputs a current $I_1$, which flows through a series circuit of the temperature-dependent measuring resistor 1 and the reference resistor 7. The connection point 26 located between the connection contact banks 3 and 5 of the two resistors is electrically connected to the negative input 16 of the differential amplifier 13 for the purpose of inverse feedback. Since the potential (reference voltage) at the tap 26 equals the potential at the tap 21 and thus must remain at least approximately constant ($U_{point21} = U_{point26} + U_{offset}$; where $U_{offset}$ is the offset voltage), a constant current $I_1$ is set via the reference resistor 7. The current flowing through the measuring resistor 1 can be calculated in the following manner: $I_1 = U_{a,b}/R_{ref}$, wherein $U_{a,b}$ indicates the voltage applied at the reference resistor 7, while $R_{ref}$ stands for the resistance value in ohms of the reference resistor 7. $I_1$ lies in the order of magnitude of approx. 1 ... 2 mA. This means that during heating of the temperature-dependent measuring resistor 1 being flowed through by the constant current $I_1$, the potential at the differential amplifier output 19 is increased toward positive, while the input voltage at the inputs 15 and 16 remains unchanged because of the constant voltage at resistor 7. Because of the linear relationship between the ohmic resistance and temperature of the measuring resistor 1, the potential at the output 19 of the differential amplifier 14 is also increased in a corresponding linear manner with increasing temperature, or falls when the temperature is falling. The connection point 25 lying at the potential of output 19 is connected to the positive input 17 of the differential amplifier 14, acting as a subtracting circuit, whose negative input 18 is connected to the connection point 29. Connection point 29 is connected via the resistor 30 for the purpose of inverse feedback to the connection point 31 or to the output 20 of the differential amplifier 14 as well as via the resistor 28 to the positive pole of the voltage supply via the connection contact surface 10. The potential difference prevalent between the potential at the connection point 25 and ground 12 is indicated by U1, while the potential difference occurring between the connection point 29 and the ground 12 is indicated by U2. From this results that during increasing heating U1 becomes larger, whereby the potential difference Ua occurring between output 20 of the differential amplifier 14 and ground 12 changes according to the following relationship:

$$U_a = K1 \times U1 - K2 \times U2,$$

where K1 and K2 are the amplification factors belonging to the non-inverting or inverting input of a subtractor. From FIG. 2 it is apparent that the output voltage Ua (in V) output between the connection contact surfaces 11 and 12 increases or drops linearly with the temperature T (in ° C.) applied at the temperature-dependent resistor 1:

$$U_a = \left(1 + \frac{R2}{R1}\right) \cdot \left[U_{ref} \cdot \frac{Rb}{Ra + Rb} + R_{pt} \cdot I_l\right] - \frac{R2}{R1} \cdot U_{ref},$$

where $R_{pt}$, Ra and Rb are the values of the resistors 1, 22, 23, and R1 and R2 are the values of the resistors 28 and 30; the reference voltage $U_{ref}$ amounts to 5V. The offset voltage of both differential amplifiers was disregarded herein because of its negligibility.

Figure 3:
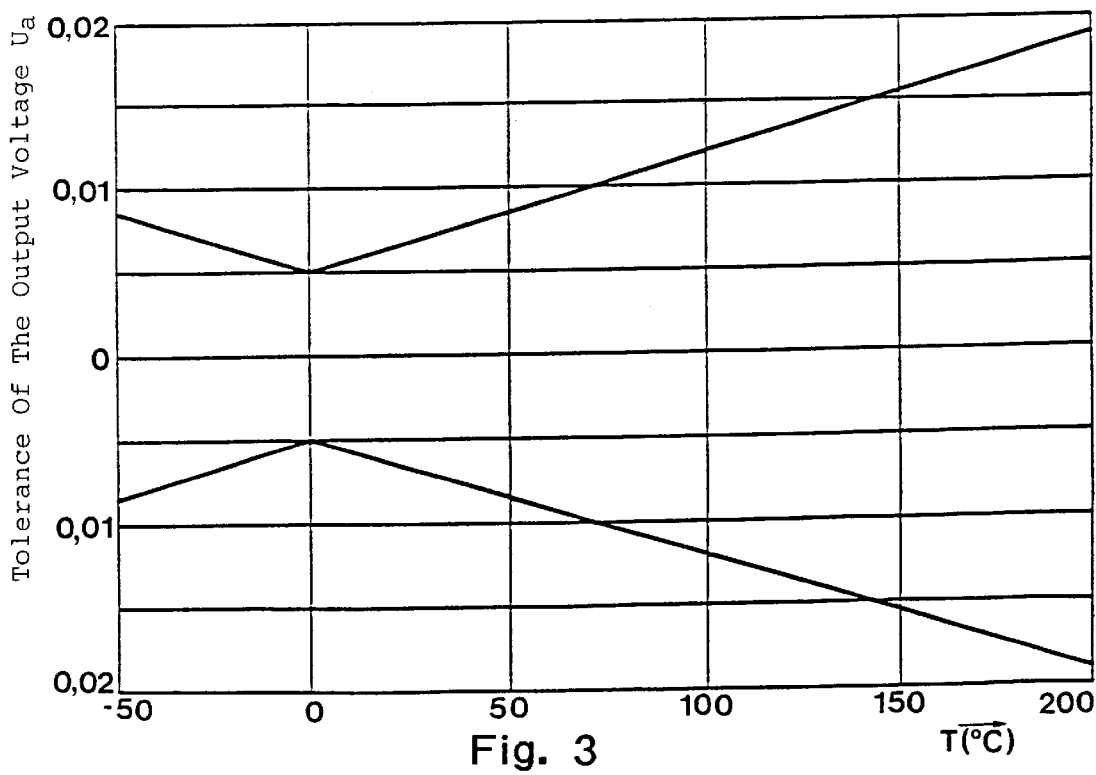
FIG. 3 shows the allowed tolerance range of the output voltage $U_A$ in volts in relation to the temperature T in degrees Celsius as it follows the tolerance range of the platinum measuring resistor according to DIN/EC 60751 Class B.

The relationship between the temperature and the tolerance of the output voltage Ua (see FIG. 3) results from the calculation of the amplification while taking into consideration the temperature-dependent progression of the tolerance of the measuring resistor 1 with the temperature according to DIN EN 60751. In order to keep the offset voltage drifts occurring in real usage within certain limits, self-adjusting differential amplifiers are used.

Figure 4:
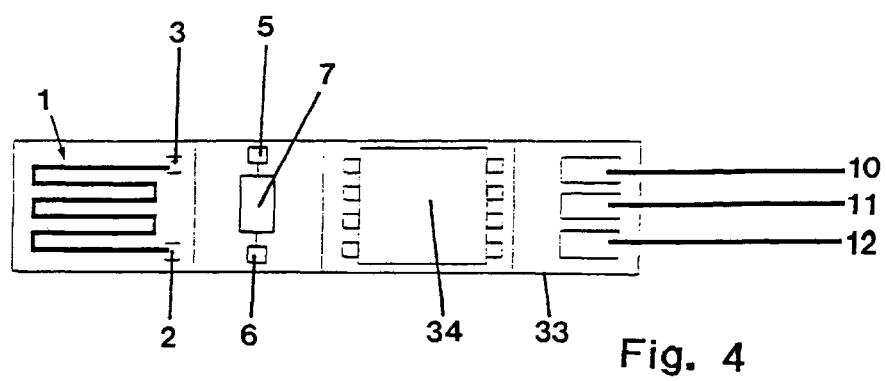
FIG. 4 shows the construction of a conductor plate using a PT 1000 temperature sensor as a measuring resistor (i.e., platinum measuring resistor having a resistance of 1000 ohms at 0° C.), a reference resistor, and an integrated circuit for the read-out device as well as connection banks or pads.

In FIG. 4 the micro-module 34 located on the ceramic substrate 33 is recognizable. The micro-module 34 contains practically all essential structural components of the read-out circuit 4 except for the temperature-dependent measuring resistor 1 and the reference resistor 7. On the substrate 33 the measuring resistor 1 and the reference resistor 7 are mounted and are connected through strip conductors or bonding wire connections (not shown here) via connection contact banks 2 and 3 or 5 and 6 to the electrical circuit 4 of the micro-module 34. The measuring resistor 1 is preferably manufactured by thin-layer technology and thus has a resistance layer made of platinum or of a platinum- based alloy, while the reference resistor 7 is preferably a discrete structural component whose resistance is practically temperature-independent. Micro-module 34 is constructed by silicon technology and can be operated in a temperature range of up to 300° C. This high temperature-stable silicon technology is described in detail, for example, in "High Temperature-Stable Analog Circuit Components in SIMOX Technology" by Michael Verbeck, submitted as a dissertation to the Gerhard-Mercator University-Comprehensive College-Duisburg (Department of Electrical Engineering) on May 23, 1996, and published in 1997 in Series 9 (Electronics) of the *VDI Progress Reports* under No. 262 in the VDI Verlag GmbH, Düsseldorf.

Furthermore, the connection contact surfaces 10 and 12 provided for connection to the direct current voltage supply, or the connection contact surfaces 11 and 12 provided for voltage measurement, can be recognized, wherein the connection contact surface 12 forms a common ground.

It will be appreciated by those skilled in the art that changes could be made to the embodiment(s) described above without departing from the broad inventive concept thereof. It is understood, therefore, that this invention is not limited to the particular embodiment(s) disclosed, but it is intended to cover modifications within the spirit and scope of the present invention as defined by the appended claims.

We claim:

1. A sensor comprising a temperature-dependent measuring resistor connected by a connection contact to an evaluation circuit and flowed through by an impressed current, wherein a voltage signal falling across the measuring resistor is determined, said voltage signal relating to the temperature of the measuring resistor in an at least approximately linear proportion, wherein the measuring resistor (1) is electrically connected at one end (2) both with a constant current source and with an electrical circuit for outputting a temperature-voltage signal, a connection point (26) of a series connection composed of the measuring resistor (1) and a reference resistor (7) being connected to the electrical circuit, wherein the temperature-dependent measuring resistor (1) and the reference resistor (7) are each arranged as discrete structural components on a substrate (33) having an electrically insulating surface, and wherein connection-contact banks (2, 3) for the measuring resistor (1) and connection contact banks (5, 6) for the reference resistor (7) are each connected via strip conductors or wire connections to the elevation circuit also arranged on the substrate (33) in a micro-module (34), wherein the micro-module (34) is constructed in silicon technology, and the sensor operates at temperatures up to about 300° C.

2. The sensor according to claim 1, wherein the substrate (33) is constructed as an electronically insulating ceramic.

3. The sensor according to claim 2, wherein the ceramic comprises $Al_2O_3$.

4. The sensor according to claim 1, wherein the temperature dependent measuring resistor is manufactured by thin layer technology.

5. The sensor according to claim 1, wherein the measuring resistor (1) has a resistor layer made of platinum or of a platinum-based alloy.

6. The sensor according to claim 4, wherein the measuring resistor (1) forms, together with a substrate (33), a thin layer component, on whose surface the reference resistor (7) and the micro-module (34) are attached in addition.

7. The sensor according to claim 1, wherein the reference resistor (7) is manufactured by thin layer technology.

8. The sensor according to claim 1, wherein a metal layer of the reference resistor (7) has a temperature-independent resistor progression.

9. The sensor according to claim 8, wherein the reference resistor (7) comprises an alloy made of nickel-chromium or constantan.

10. The sensor according to claim 9, wherein a substrate comprising ceramic functions as a support for a thin-layer measuring resistor (1).

11. The sensor according to claim 1, wherein both the measuring resistor (1) and the reference resistor (7) are mounted on a substrate (33) by thick film technology.

12. The sensor according to claim 1, wherein SIMOX technology is used as the silicon technology.

13. An electric circuit for temperature measurement comprising a sensor according to claim 1 having a temperature-dependent measuring resistor (1) connected to a reference resistor (7) in series, wherein this series connection is flowed through by a constant impressed current, a connection point (26) located between both resistors is connected to an negative input (16) of a first feedback differential amplifier (13) that outputs the constant impressed current, and a positive input (15) of the first differential amplifier is supplied with direct current voltage tapped from a voltage divider, wherein during a temperature increase in an area of the measuring resistor (1) a potential at an output (19) of the first differential amplifier (13) connected to the measuring resistor (1) increases, while a potential at the output (19) of the differential amplifier (13) falls when the temperature falls, and a temperature-dependent voltage signal that is output at the differential amplifier (13) is supplied to a positive input (17) of an after-connected second differential amplifier (14) preset with an inverse feedback resistor (30), wherein an output of this second differential amplifier (14) is connected to a measurement unit for measuring a voltage characteristic of the temperature.

* * * * *